United States Patent [19]

Davis et al.

[11] 4,105,614

[45] Aug. 8, 1978

[54] STORAGE STABLE WATER-DILUTABLE EPOXY BASED COATING FOR METAL FOOD CONTACT SURFACES

[75] Inventors: Kenneth G. Davis, Ross Township, Allegheny County; George B. Dué, Pittsburgh; Albert H. Lund, McCandless, all of Pa.

[73] Assignee: Mobil Oil Corporation, New York, N.Y.

[21] Appl. No.: 736,984

[22] Filed: Oct. 29, 1976

[51] Int. Cl.² .............................................. C08L 63/02
[52] U.S. Cl. ...................... 260/29.4 R; 260/29.2 FP; 260/33.2 EP; 260/32.8 EP; 260/834; 428/416
[58] Field of Search .................. 260/47 EP, 29.2 EP, 260/33.2 EP, 29.4 R, 32.8 EP, 834

[56] References Cited

U.S. PATENT DOCUMENTS

| | | | |
|---|---|---|---|
| B 526,997 | 1/1976 | Tobias et al. | 260/29.2 EP |
| 3,840,483 | 10/1974 | Guldenpfennial. | 260/19 EP |
| 3,844,998 | 10/1974 | Jeffery et al. | 260/29.4 R |
| 3,847,849 | 11/1974 | Lackner | 260/19 EP |
| 3,862,914 | 1/1975 | Anderson et al. | 260/29.2 EP |
| 3,985,695 | 10/1976 | Tobias et al. | 260/29.2 EP |

Primary Examiner—Harold D. Anderson
Assistant Examiner—E. A. Nielsen
Attorney, Agent, or Firm—Charles A. Huggett; Hastings S. Trigg

[57] ABSTRACT

A resin is provided which is the adduct of a bisphenol and a diglycidyl ether of a bisphenol reacted with an anhydride to an Acid No. of 35 to 150. This resin is solubilized with a volatile amine, ammonia, or NH₄OH in a solvent mixture of water, alkoxyethanols, alcohols, and alkyl ethers of diethylene glycol and combined with an aminoplast to produce a coating composition utilizable to coat metal surfaces that will contact a food or beverage, such as in metal packaging containers.

11 Claims, No Drawings

STORAGE STABLE WATER-DILUTABLE EPOXY BASED COATING FOR METAL FOOD CONTACT SURFACES

BACKGROUND OF THE INVENTION

1. Field of the Invention

This invention is concerned with epoxy based resins water-solubilizable with ammonia or an amine and with water based coating compositions containing them.

2. Description of the Prior Art

It has been proposed to form water dilutable emulsions or dispersions containing epoxy resins for use as water based coatings. Such coatings have disadvantages, and it is highly desirable to provide water-soluble epoxy based coatings. Prior epoxy based coatings have poor shelf life due to the presence of oxirane groups and/or unreacted anhydride.

It is a discovery of this invention that such water based coatings can be obtained by defunctionalization of the oxirane groups by adduction with a bisphenol and making the adducts water-solubilizable by reaction with an anhydride. It has also been found that the anhydride value must be low to obtain increased shelf life.

Insofar as is now known a resin system of this type and coatings containing them have not been proposed.

SUMMARY OF THE INVENTION

This invention provides a water solubilizable resin that comprises an adduct of a bisphenol and a diglycidyl ether of a bisphenol, using a molar ratio of bisphenol to diglycidyl ether between about 2:1 and about 9:8, further adducted with an anhydride in an amount sufficient to provide an acid number between about 35 and about 150.

It also provides a coating composition comprising such resin and an aminoplast, in a weight ratio between about 95:5 and about 60:40, solubilized with a volatile tertiary amine, ammonia, or ammonium hydroxide to a pH of about 7.0 to about 9.1 in at least one solvent of the group alcohols, alkoxyethanols, ketones, and alkyl ethers of diethylene glycol, each present in between about one weight percent and about 20 weight percent of the weight of the final composition, and diluted with water to a solids content between about 10 weight percent and about 25 weight percent.

It also provides substrates coated with such coating composition and metal packaging containers, interior coated with such coating composition and baked, containing a food or beverage.

DESCRIPTION OF SPECIFIC EMBODIMENTS

In general, the water dilutable resins of this invention are prepared by adducting sufficient bisphenol to a diglycidyl ether of a bisphenol to react with all epoxy groups. The reaction mass is usually heated to about 120° C. and is accompanied by an exotherm which raises the temperature to 160°–220° C. at which temperature the reaction proceeds without the necessity of added heat. This adduction is usually continued for about 45 minutes to an hour until the epoxy value is 0.004 or less. At this point there is added a solvent for the reaction mass that has a boiling point above 100° C. up to about 125° C. and is inert to anhydrides. This solvent is not only a solvent for the reaction but is a component of a binary azeotrope with water.

Suitable solvents are ketones, ethers, and esters. Non-limiting examples of suitable solvents are methyl n-propyl ketone, methyl isobutyl ketone, diisobutyl ether, and n-propyl acetate, n-butyl acetate, isobutyl acetate, n-propyl propionate, and ethyl butyrate. Ketones are especially preferred.

The reaction mixture is refluxed to remove all water that may be present. Anhydrous conditions are necessary before the anhydride is added. After all water has been removed, an anhydride is added in an amount sufficient to provide an acid number between about 35 and about 150, preferably 40-90. Generally the reaction is carried out at about 100°–120° C. for about 2–4 hours. The reaction of the anhydride is complete when the alcoholic acid number and the aqueous acid number are substantially the same, usually within two units of each other. In order to ensure good shelf life, the anhydride number must be below about 2 and preferably zero. The anhydride number is the difference between the alcoholic acid number and the aqueous acid number.

An alkoxy ethanol boiling at about 130° C. or higher is added and the azeotroping solvent is removed under vacuum. At least two-thirds of such solvent must be removed and in preferred practice it should all be removed. At this point other solvents such as alcohols can be added to reduce solid contents to between about 50 and 75 weight percent.

The epoxy resin utilizable herein is a diglycidyl ether of bisphenol, a class of compounds which are constituted by a pair of phenolic groups interlinked through an aliphatic bridge. While any of the bisphenols may be used, the compound 2,2-bis(p-hydroxy phenyl) propane, commonly known as bisphenol A, is more widely available in commerce and is preferred. The diglycidyl ethers of bisphenol A are readily available commercially. The epoxy resin, i.e. the diglycidyl ether of bisphenol A will have an epoxy equivalent weight between about 180 and about 2500.

The bisphenol that is adducted with the epoxy resin can be any bisphenol as disclosed hereinabove. Preferably bisphenol A is used. The molar ratio of bisphenol to diglycidyl ether of bisphenol will be between about 2:1 and about 9:8. In order to insure a final product having satisfactory long shelf life, sufficient bisphenol should be used to add to (cap) all epoxy groups of the resin.

The preferred anhydride used in the resins of this invention is trimellitic anhydride. Other cyclic anhydrides which can be used include succinic anhydride, methyl succinic anhydride, tricarballylic anhydride, phthalic anhydride, hexahydrophthalic anhydride, and maleic anhydride.

The amount of anhydride used should be sufficient to obtain an acid number of 35 to 150, preferably between about 40 and about 90, in order to insure water solubility when the resin is neutralized.

In order to obtain good shelf life of the coating composition, there should be no unreacted anhydride groups. The amount of anhydride used can be readily calculated from the hydroxyl number of the bisphenol adducted epoxy. In the case of trimellitic anhydride, the use of 7.5 weight percent trimellitic anhydride and 92.5 weight percent of the adducted epoxy resin gives an acid number of about 45 when using an epoxy resin having an epoxy equivalent weight of about 185-192. The use of 15 weight percent trimellitic anhydride and 85 weight percent adducted epoxy resin gives an acid number of about 90 when using an epoxy resin having an epoxy equivalent weight of about 185-192.

In forming a coating composition containing the acidic resin, the resin is neutralized with a tertiary amine, ammonia, or ammonium hydroxide to a pH of about 7.0 to about 9.1. Typical amines utilizable include triethylamine, tripropyl amine, dimethylethanol amine, diethylethanol amine, dimethylethyl amine and methylidiethyl amine.

The material used to thermoset the coating is a conventional aminoplast cross-linking agent. Such agents are well known in the art. There can be used any of the thermosetting alkylated aminoplast resins, such as the urea-aldehyde resins, the melamine-aldehyde resins, the dicyandiamide-aldehyde resins and other aminoplast-aldehyde resins such as those triazine resins produced by the reaction of an aldehyde with formoguanamine, ammeline, 2-chloro-4,6-diamino-1,3,5-triazine, 2-phenyl-p-oxy-4,6-diamino-1,3,5-triazine, 6-methyl-2,4-diamino-1,3,5-triazine; 2,4,6-trihydrazine-1,3,5-triazine, and 2,4,6-triethyl-triamino-1,3,5-triazine. The mono-, di-, or triaralkyl or mono-, di-, or tri-aryl melamines, for instance 2,4,6-triphenyltriamino-1,3,5-triazine are preferred. As aldehydes used to react with the amino compound to form the resinous material, one may use such aldehydes as formaldehyde, acetaldehyde, crotonic aldehyde, acrolein, or compounds which engender aldehydes, such as hexamethylene-tetramine, paraldehyde, paraformaldehyde, and the like. The preferred aminoplast is a highly butylated urea-formaldehyde.

The solvent system used in the coating composition will include alcohols, alkoxy ethanols, ketones and alkyl ethers of diethylene glycol. Suitable alcohols are those having between about 2 and about 8 carbon atoms and having a boiling point up to about 180° C. Non-limiting examples of utilizable alcohols include special denatured ethanols (Formula 1), propanol, butanol, isobutanol, t-butanol, pentanol, hexanol, 2-methylpentanol, 3-methylpentanol, heptanol, isoheptanol, octanol, isooctanol and 2-ethylhexanol.

The alkoxy ethanols utilizable are those having between 1 and 6 carbon atoms in the alkoxy group. Non-limiting examples include methoxy ethanol, ethoxy ethanol, butoxy ethanol and hexoxy ethanol. Also utilizable are propoxy propanol and butoxy propanol.

The ketones utilizable are aliphatic ketones containing between 3 and 8 carbon atoms. Non-limiting examples of utilizable ketones are acetone, diethyl ketone, methylethyl ketone, methylpropyl ketone, methylbutyl ketone, methylamyl ketone, methylhexyl ketone, ethylpropyl ketone, ethylbutyl ketone, ethylamyl ketone and methoxy acetone.

The utilizable alkyl ethers of diethylene glycol will contain between 1 and 4 carbon atoms in the alkyl group. Non-limiting examples include the monoethyl ether of diethylene glycol, the monoethyl ether of diethylene glycol and monobutyl ether of diethylene glycol.

In general, alkylethanols, ketones and alkyl ethers of diethylene glycol are primarily solvents for resin and aminoplast. Lower alcohols, such as ethanol, t-butanol, also assist in wetting surface being coated. Higher alcohols, such as isooctanol, also serve as defoamants. In controlling viscosity of the final coating composition, higher boiling solvents, such as hexoxyethanol tend to increase viscosity and lower boiling solvents, such as butoxyethanol and methyl ethyl ketone, tend to decrease viscosity.

Although mixtures of organic solvents are highly preferred, satisfactory coating compositions can be prepared using a single methoxy ethanol, ketone or alkyl ether of diethylene glycol.

In the finished coating composition, the solids content (resin and aminoplast) will be between about 10 and about 25 weight percent, preferably about 15 weight percent. The volatile system (including amine, ammonia, or ammonium hydroxide) will be between about 90 weight percent and about 75 weight percent of the finished coating composition, preferably about 85 weight percent. About 65 to 90 weight percent of the volatile system will be water and the balance (35 to 10 weight percent) will be organic volatile solvents, including amine, ammonia, or ammonium hydroxide. Preferably, the ratio of water to organic volatiles will be about 70:30 to 80:20 in the volatile system. Each component of the solvent system will be present in between about one weight percent and about 20 weight percent of the weight of the final composition. A typical and preferred solvent system is defined in the working examples.

EXAMPLE 1

Into a reaction kettle there was charged 32.77 parts of diglycidyl ether of bisphenol A having an epoxy equivalent weight of 185 to 192 and 24.57 parts of bisphenol A. All parts expressed in the examples are by weight. The mixture was heated rapidly over about 30 minutes to a temperature of about 120° C and an exotherm occurred but the reaction mixture was not cooled. After about 45 minutes, the epoxy value was 0.003. Then 10.14 parts methyl isobutyl ketone was added and the reaction mixture was refluxed to remove any water present, in a water trap.

4.64 parts trimellitic anhydride was added and the mixture was held for about 3 hours at 120° C. until the anhydride value was zero. 13.94 parts butoxy ethanol was added and the reaction mixture was stripped of methyl isobutyl ketone under vacuum to maximum temperatures of 100° C. until two-thirds to all methyl isobutyl ketone was stripped. Tertiary butyl alcohol (13.94 parts) was added until the mixture was clear and uniform. The resulting material had an acid number of 44 to 48.

EXAMPLE 2

A mixture of 19.27 parts of the product of Example 1 and 1.50 parts of a highly butylated urea-formaldehyde aminoplast (Beetle 80) was heated to about 120° F. Then under slow speed stirring was added a solvent mixture of 1.20 parts butoxy ethanol, 4.38 parts methylethyl ketone, 4.29 parts butylether of diethylene glycol, 4.67 parts hexoxyethanol, 1.46 parts isooctanol, and 2.50 parts denatured alcohol (Synasol) and 1.26 parts dimethylethanolamine. The solvent Synasol contains denaturants in the proportions of 100 gallons of special denatured alcohol formula 1, 1 gallon of methyl isobutyl ketone, 1 gallon ethyl acetate, 1 gallon aviation gasoline. The reaction mixture was stirred until uniform. 59.47 parts of deionized water was added slowly to form the finished coating composition which had a straw color and a slight haze.

The coating composition of this invention is primarily useful for coating aluminum, tin plated steel, pretreated metals, steel, and metals coated with the same or different resin composition (i.e. a second coat). The coating composition can be used however for coating other substrates such as wood, paper and leather. The most preferred and useful use of the coating composition is for interior coating of metal containers that will come in contact with food or beverages. Coating can be done by any coating procedure well known to those skilled in the art including direct rollcoating, reverse rollcoating, electrodeposition, spraying, flow coating and the like. The preferred method however in coating the interior of metal contains is by spraying. After coating the substrate, the coating is baked for about 5 seconds to about 5 minutes at between about 250° F. and about 600° F. A typical bake is for about 2 minutes at about 400° F.

The coating composition of Example 2 was tested for adhesion, pasteurized adhesion and blush. The adhesion test is carried out by cross-hatching a coated area with individual score lines approximately 1/16 inch apart. Then Scotch tape is firmly applied to the cross-hatched area and removed with a quick snap. The amount of coating remaining on the panel is viewed visually and rated on a 0-10 scale (10 = perfect adhesion). Pasteurization is carried out by immersing the coated panels in water at 145° F. for 30 minutes. Then the panels are wiped dry with absorbent towels and the adhesion test is carried out as above described. The amount of blush is rated on the pasteurized panel using a scale of 0 to 10 in which 0 is very severe blush and 10 is no blush.

EXAMPLE 3

Treated aluminum test panels were coated with the coating composition of Example 2 with a bar coater to a film weight of 2.5 to 3.0 milligrams per square inch. These test panels showed an adhesion rating of 10 in the adhesion test. In the pasteurization test the panels gave a rating of 10 adhesion and 10 on blush.

The effect of a coating on the flavor of a packaged product is determined in a Flavor Difference Evaluation. Bottles of commercial beer are chilled to about 40°-45° F. and uncapped. Sheets of aluminum foil (1 mil) are bar coated on both sides with the coating being evaluated and baked. Then, a sheet of foil is rolled lightly and inserted into each bottle of beer and the bottle is recapped with a new cap.

For comparison, additional bottles of the same beer are provided with rolls of aluminum foil that have been coated on both sides with an accepted commercial coating for interior coating (solvent-based epoxy coating) and baked. The test coating and the control coating were baked for 70 seconds at 400° F.

After storage for 3 days at 100° F., the bottles of beer are again chilled and taste rated by 9 experienced tasters comparing the test coatings vs the control. The arithmetic average of the ratings is calculated ($\bar{x}$). Then, all rating values outside $\bar{x} \pm 2$ are excluded and another average is calculated as the quality rating (QR). The following rating scale was used on a basis of 1–9.

| | |
|---|---|
| 1 | = no flavor difference |
| 1.0 – 1.5 | = excellent flavor |
| 1.5 – 2.0 | = very good flavor |
| 2.0 – 2.5 | = good flavor |
| 2.5 – 3.0 | = acceptable flavor |
| > 3.0 | = not acceptable |

EXAMPLE 4

The coating composition of Example 2 was subjected to the Flavor Difference Evaluation. Also evaluated was a coating composition like Example 2 except that the ratio of resin to aminoplast was 70/30 (A). Test results were as follows:

| Example | $\bar{x}$ | QR |
|---|---|---|
| Control | 1.4 | 1.4 |
| 2 | 1.0 | 1.0 |
| A | 1.0 | 1.0 |

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A water solubilizable resin that comprises an adduct of a bisphenol and a diglycidyl ether of a bisphenol having an epoxy equivalent weight between about 180 and about 2500, using a molar ratio of bisphenol to diglycidyl ether between about 2:1 and about 9:8, further adducted with a polycarboxylic acid anhydride in an amount sufficient to provide an acid number between about 35 and about 150.

2. The resin of claim 1, wherein said bisphenol is bisphenol A.

3. The resin of claim 2, wherein said acid number is between about 40 and about 90.

4. The resin of claim 3, wherein said diglycidyl ether is the diglycidyl ether of bisphenol A having an epoxy equivalent weight of 185–192, said molar ratio is 2:1, and said anhydride is trimellitic anhydride.

5. The resin of claim 4, wherein the anhydride number is zero to 2.

6. The resin of claim 5 dissolved in a 50:50 mixture, by weight, of a $C_1$–$C_4$ alkoxyethanol and a $C_2$–$C_4$ alcohol to a solids content between about 50 and about 75 weight percent.

7. The resin of claim 6 wherein said alkoxyethanol is butoxyethanol and said alcohol is t-butyl alcohol.

8. A coating composition comprising the resin of claim 1 and an aminoplast, in a weight ratio between about 95:5 and about 60:40, solubilized with a volatile tertiary amine, ammonia, or ammonium hydroxide to a pH of about 7.0 to about 9.1 in a solvent or mixtures of solvents selected from the group consisting of alcohols, alkoxyethanols, ketones, and alkyl ethers of diethylene glycol, each present in between about one weight percent and about 20 weight percent of the weight of the final composition, and diluted with water to a solids content between about 10 weight percent and about 25 weight percent, wherein the volatile system, including amine, ammonia, or ammonium hydroxide, contains between about 65 and about 90 weight percent water and between about 35 and about 10 weight percent organic volatile solvents.

9. The coating composition of claim 8, wherein said resin is the resin of claim 6.

10. The coating composition of claim 8, wherein said resin is the resin of claim 7, said aminoplast is highly butylated urea-formaldehyde resin, said amine is dimethyl ethanol amine, the solvent mixture is a mixture of butoxyethanol, t-butanol, methyl ethyl ketone, butyl ether of diethylene glycol, hexoxyethanol, isooctanol, and denatured alcohol, said volatile system contains about 70 weight percent water and about 30 weight percent organic solvents, and said solids content is about 15 weight percent.

11. A substrate coated with the coating composition of claim 8 and baked.

* * * * *